(12) United States Patent
Blackwell et al.

(10) Patent No.: US 6,223,220 B1
(45) Date of Patent: Apr. 24, 2001

(54) DESIGN OF COMPUTER NETWORKS

(75) Inventors: Robert E. Blackwell, Suffolk; Jason P. Butcher, Cambridgeshire, both of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/101,398

(22) PCT Filed: Apr. 15, 1998

(86) PCT No.: PCT/GB98/01092

§ 371 Date: Jul. 9, 1998

§ 102(e) Date: Jul. 9, 1998

(87) PCT Pub. No.: WO98/47265

PCT Pub. Date: Oct. 22, 1998

(30) Foreign Application Priority Data

Apr. 15, 1997 (GB) .................................................. 9707549

(51) Int. Cl.[7] .................................................. G06F 15/173
(52) U.S. Cl. .................................................. 709/223; 709/220
(58) Field of Search .................................................. 713/1; 709/223, 709/220, 221, 222

(56) References Cited

U.S. PATENT DOCUMENTS

| 5,175,800 | 12/1992 | Galis et al. . |
|---|---|---|
| 5,255,345 | 10/1993 | Shaefer . |
| 5,426,674 | 6/1995 | Nemirovsky et al. . |
| 5,491,742 | 2/1996 | Harper et al. . |
| 5,596,703 | 1/1997 | Eick et al. . |
| 5,598,532 | 1/1997 | Liron . |
| 5,751,962 | * 5/1998 | Fanishier et al. ..................... 395/200 |
| 5,793,974 | * 8/1998 | Messinger ........................ 395/200.54 |
| 5,796,951 | * 8/1998 | Hamner et al. .................. 395/200.53 |
| 5,845,124 | * 12/1998 | Berman ............................... 395/500 |
| 5,870,561 | * 2/1999 | Jarvis et al. ..................... 395/200.68 |
| 5,968,122 | * 10/1999 | Schlosser et al. .................... 709/223 |

OTHER PUBLICATIONS

Wm. Press et al, Numerical Recipes in C, "The Art of Scientific Computing" (pp. 342–352).

Telecommunications Series, "A Knowledge–Based System for the Configuration and Pricing of Network Management Systems", D.L. Scott and P.M. Bull, pp. 115–131 (1996).

* cited by examiner

Primary Examiner—Thomas G. Black
Assistant Examiner—Mary Wang
(74) Attorney, Agent, or Firm—Nixon & Vanderhye P.C.

(57) ABSTRACT

A method of designing a computer network uses an object-based computer representation which allows on-screen linking of a service object, representative of a network service, to site objects representative of physical sites on a wide-area network. The user specifies expected traffic demands between the sites, and an algorithm calculates a physical connectivity map representative of proposed hardware circuits linking physical sites.

16 Claims, 7 Drawing Sheets

DESIGN OF COMPUTER NETWORKS

BACKGROUND OF THE INVENTION

The present invention relates to a method of designing computer networks.

Currently, the design of computer networks, particularly wide area networks, is a long and complex procedure requiring specialist trained staff. For a complex network, it may take a specialist several weeks to design an appropriate solution for the customer's requirements, and to produce a fully costed recommendation. The customer is often not in a position to give approval until the fully costed recommendation has been received, and if at that stage the customer requests amendments to the design there may be significant delays before the designer can produce a revised proposal. Since each iteration/redesign may take several weeks, it will be understood that the entire process between the initial customer's query and the implementation of the final solution may take some considerable time.

According to the present invention there is provided a method of designing a computer network comprising:

(a) selecting a plurality of site objects, each site object being an object-based computer representation of a corresponding physical site;

(b) defining network traffic demands between at least some of the physical sites;

(c) selecting a service object, said service object being a object-based computer representation of a network service for transmitting data between physical sites, and associating said service object with at least some of the selected site objects; and (d) calculating from the network traffic demands and the properties of the service object, without simulating operation of the network, a physical connectivity map representative of hardware circuits linking physical sites.

SUMMARY OF THE INVENTION

The method of the present invention is preferably embodied within an object-based computer representation in which some or all of the following may be represented by computer objects: the required physical (customer) sites on the proposed wide-area network, groupings of such sites, expected peak traffic demand between sites, Points of Presence (PoPs) representative of the locations at which the customer sites will access the network, the "cloud" or service which will form the basis of the network, the logical links between the cloud object and the customer site objects, and the proposed physical circuits which will link the physical sites in the proposed actual implementation.

The sites may be classified into Client Sites, Host Sites and Cascade Sites. A Host Site is a central, or hub site, typically a data or computer centre which may be connected to a number of Cascade or Client Sites. A Client Site is an endpoint in the proposed network, and will often be a branch site. A Cascade Site is a site which forms part of a "concentration layer", between the access network which links in the Client Sites and the core network which links the Host Sites.

The Points of Presence that is represented by the Points of Presence object may be real physical PoPs where a customer site connects into the network, or alternatively virtual or "logical" PoPs. These are points at which a service provider charges for a connection as if it were a real PoP. Normally, the actual physical connection is elsewhere. Logical or virtual PoPs may be used to lower the cost for a customer in areas where the service provider has less core network infrastructure for the particular service.

The method may include representing some or all of the objects as icons on a computer display, and effecting and altering connections and interactions between objects by manipulating the icons.

The method may include the step of providing one or more on-screen views, in which the corresponding objects are represented by on-screen icons. Preferable views include a service view, showing logical links between each site object and its associated service object; a physical view, showing the proposed physical circuits linking the sites; a logical view, showing the customer's requirement for traffic flows between sites; and a PoP view, showing the physical sites and their corresponding PoP. In the PoP view, the PoP associated with each physical site may be chosen according to any convenient algorithm. For example, the chosen PoP for each site may be that which is physically the closest, or alternatively that for which access is the cheapest.

Pricing and/or reporting functions may be provided by passing on the physical connectivity map and/or the attributes of one or more of the objects within the model to pricing/reporting engines. The pricing engine may use the object attributes as parameters to pass to an external pricing database which returns information on individual and total costs for the proposed network design.

The invention further extends to a computer program embodying a method of designing a computer network as described above, or as set out in the claims. The invention further extends to a computer-readable media carrying such a computer program, such as for example a computer disk or a CD-ROM.

SUMMARY OF THE FIGURES

The invention may be carried into practice in a number of ways and one specific embodiment will now be described, by way of example, with reference to the accompanying drawings, in which.

DETAILED DESCRIPTION OF INVENTION

Figure 1:
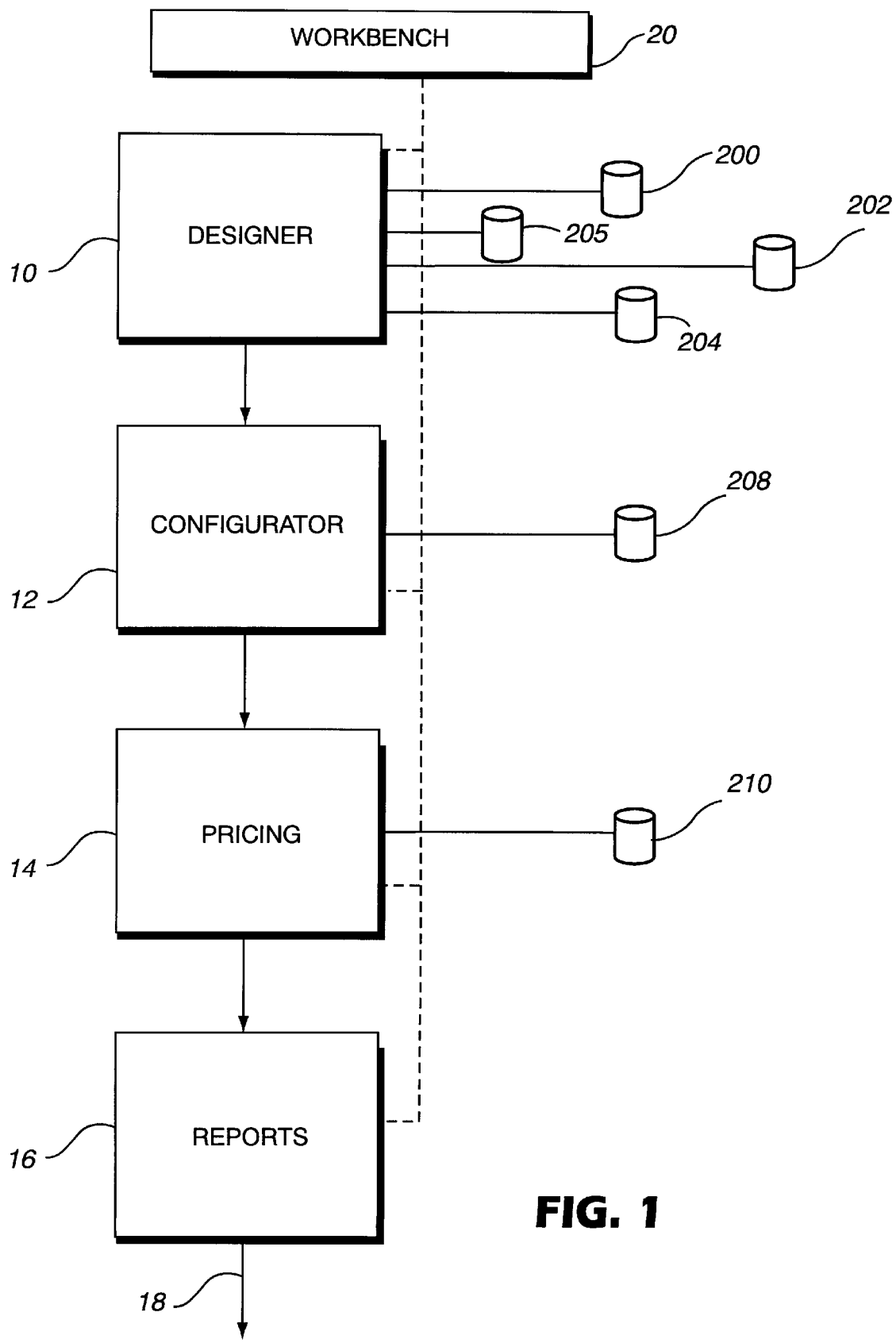
FIG. 1 is a schematic diagram showing the preferred hardware and software environment within which the preferred method of the present invention operates.

FIG. 1 illustrates schematically the hardware/software environment within which the method of the present invention will preferably operate. The preferred method is conveniently embodied in software, suitable for running on any conventional hardware platform, such as a Personal Computer. As shown in FIG. 1, the software comprises a designer module 10, a configurator module 12, a pricing module 14 and a reports module 16. Normally, a new network will be designed and priced using these modules in order, with the output from the designer module being passed to the configurator module, the output from that module being passed to the pricing module, and the output from that module being passed to the reports module. The reports module then outputs the final network design recommendation at 18 in hard copy or electronic form for the customer's approval. Provision is also made, by virtue of an over-arching interface program known as the workbench 20, for the designer to run any of the modules independently. This may particularly be useful where a current network design needs to be amended.

Most of the present description will relate to details of the designer module 10, although it will be understood that the invention in its broadest form is not necessarily related to that module alone. The preferred configurator module 12, for use with the designer module described, is disclosed in our PCT application, filed Apr. 15, 1997, under application number PCT/GB98/01092, now published as WO 98/47266.

Figure 2:
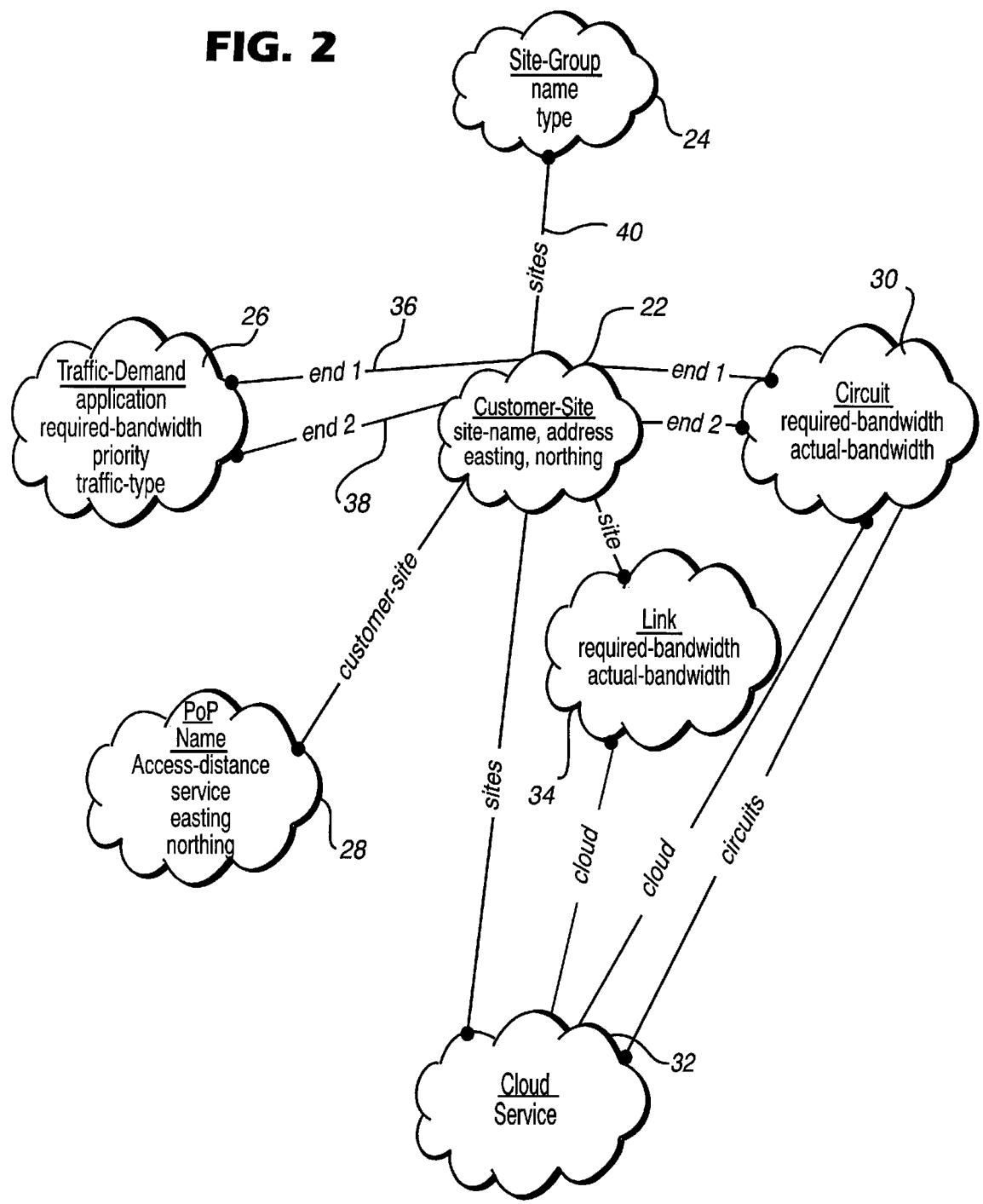
FIG. 2 illustrates the object model used by the method of the preferred embodiment.

The designer module 10 makes use of an object-based representation of the network to be designed, as illustrated in FIG. 2. Standard object-oriented terminology is used with the object class names shown underlined, and the corresponding attributes shown underneath. The primary objects of the model are as follows:

(a) customer site objects, representative of physical sites which will ultimately become the nodes of the Wide Area Network being designed. Customer site objects include attributes which specify the site name, the site address, and the site location (for example by way of an easting and a northing referred to a standard mapping basis);

(b) site group objects 24 which represent groups of customer sites. Attributes include group name and group type, each of which may be user-defined;

(c) traffic-demand objects 26 which specify the required traffic demand between customer sites. Attributes include the application, the required bandwidth, the priority and the traffic type;

(d) PoP objects 28 (or Point of Presence objects) which define the physical or virtual points of presence that will be used by the customer sites. Attributes include the name of the PoP, the access distance between the PoP and the corresponding customer site, the network service to be used, and the PoP location (for example the easting and the northing);

(d) circuit objects 30 which correspond to the actual physical connections or circuits between the customer sites. Attributes include the required bandwidth of the circuit, and the actual bandwidth (in other words, the maximum bandwidth available on that circuit);

(e) cloud (or "service") objects 32 which relate to the specific networking service that is to be used to link the customer sites. Cloud objects have a service attribute which specifies the service type (for example ISDN);

(f) link objects 34 which link the cloud objects 32 with the customer site objects 22. Attributes include the required bandwidth between the cloud and the customer site, and the corresponding actual bandwidth.

The lines in FIG. 2 between the object classes illustrate schematically how the classes interrelate. The lines should be read, starting at the end with the spot, as "has a . . . which is a . . . " (one-to-one relationship) or "has several . . . which are . . . " (one-to-many relationship). For example, the line 36 may be read as saying that the traffic demand object has an end1 which is a customer site. Similarly, the line 38 indicates that the traffic demand object has an end2 which is also a customer site. The line 40 indicates that a site group object has several sites which are customer site objects.

The way in which the object-oriented model of FIG. 2 may be used in the designing of a wide area network having customer sites across the UK will now be described with reference to FIGS. 3 to 7.

Figure 3:
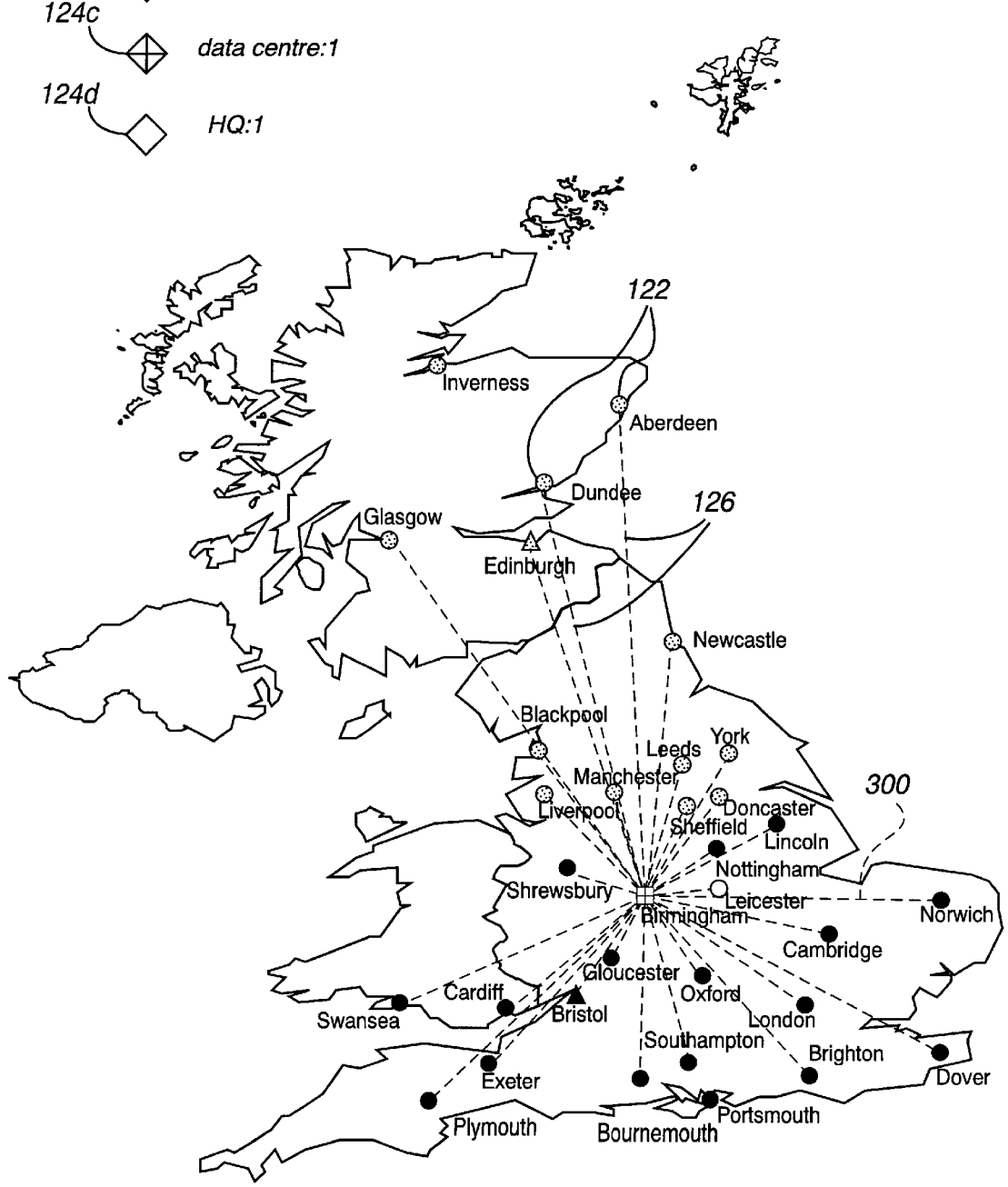
FIG. 3 shows a "logical" view of connections between physical sites.

Referring first to FIG. 3, the initial step is to choose the customer sites 122 that the customer wishes to link together within a WAN. The sites may be defined in any convenient manner, for example by being newly entered, or by being looked up in appropriate database. Referring back to FIG. 1, the customer's list of sites may be provided by means of a customer-supplied database 200. Alternatively, the locations may be chosen by entering the postcode, and looking up the location on a postcode database 202. Another option would be to type in the telephone number of the site, and look up the location, or at least an approximation to it, by a telephone number database 204. Other methods of entering the physical sites will no doubt occur to the skilled man.

Each of the physical sites 122 is an object within the customer site class 22.

Next, the individual sites may be classified into a plurality of groups, indicated in FIG. 3 by the legends 124a to d. The classification is user-defined: in the example given, some of the sites have been classified as "northern sites", some have been classified as "southern sites", one site has been classified as a "data centre", and one site has been classified as an "HQ".

Each of these site groups is represented by the software as an object within the site group class 24.

Once the physical sites have been defined, the traffic requirements between those sites need to be specified. These are shown in FIG. 3 by means of the dotted lines 126. The lines are set up on screen by clicking on one of the physical sites, and dragging the cursor to another physical site. Information is then entered, for each of the links 126, specifying the application, the required bandwidth for communications between the end points, the priority for communication between those end points, and the traffic type.

The traffic demand lines 126 are stored as objects within the traffic demand class 26.

FIG. 3 shows what is known as the "logical view", in that it shows the logical connections between physical sites. This view simply relates to the customer's requirement for traffic between those sites, and it does not show how or where the traffic will be routed in the final physical network.

Figure 4:
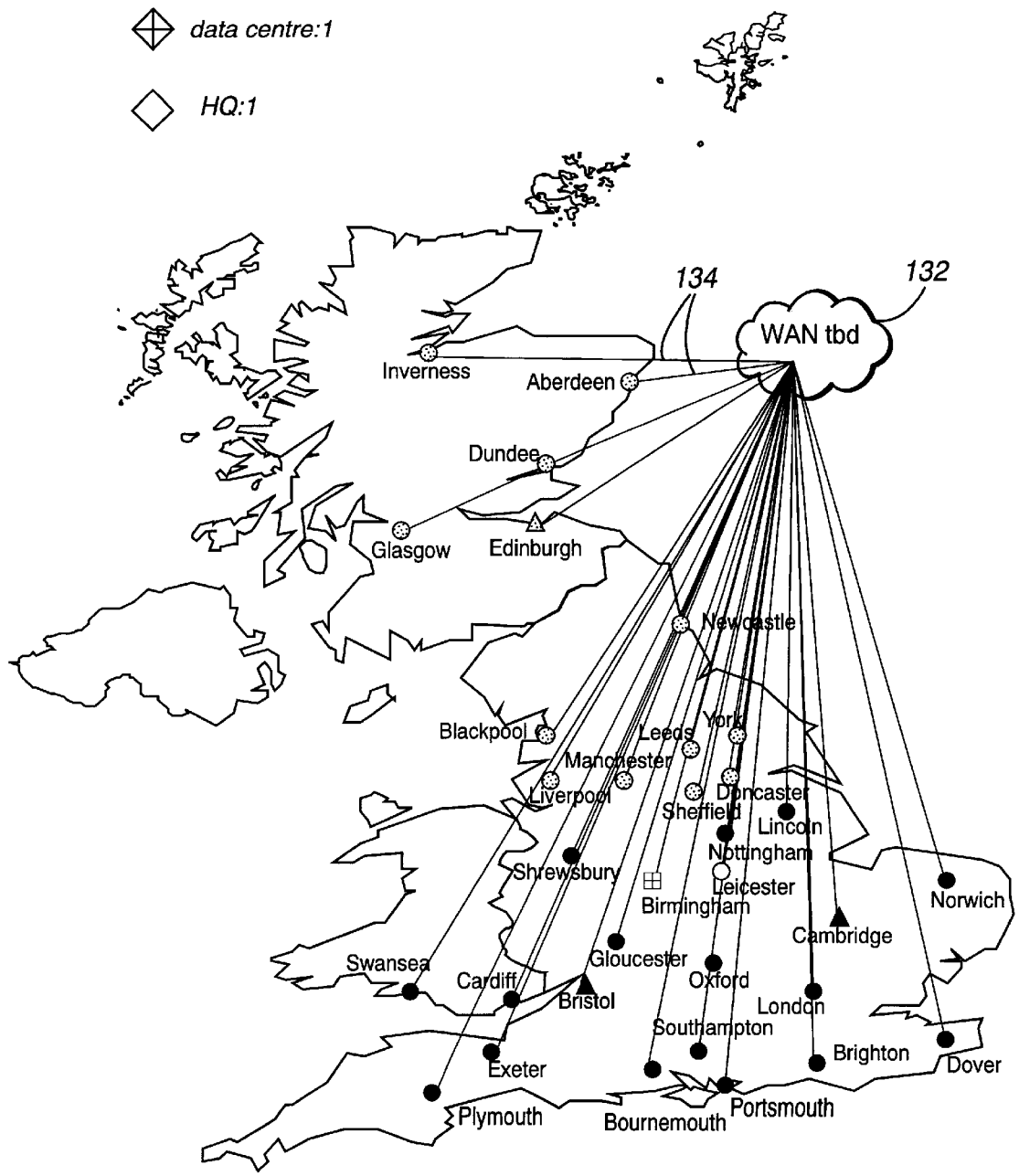
FIG. 4 shows a "service" view of connections between physical sites.

The next stage is to specify the networking service that will be used to link all of the physical sites. This is illustrated in FIG. 4, which shows all the sites connected by links 134 to a cloud 132. The cloud 132 is an object within the cloud class 32, and the links 134 are all objects within the link class 34. In FIG. 4, the cloud 132 is simply listed as a WAN "to be determined", and at this point the user now selects the specific service which is to be used to connect the physical sites. Examples might include ISDN, SMDS (Switch Multimegabit Data Service), Frame Relay, British Telecom's Flexible Bandwidth Service, and Leased Line (Private Circuit).

Once the service type has been selected, indicating that all of the sites have to be interconnected by that same managed service, the program then uses an appropriate algorithm to determine an optimal or near-optimal physical network linking all of the sites 122. The details of the physical network will of course depend upon the traffic demands which were set in FIG. 3, as well as the service that was set in FIG. 4.

The details of the algorithm per se are not important, since the problem is essentially one of minimisation, and a suitable algorithm could therefore easily be created by the skilled man in the art by means of standard minimisation techniques. However, for the sake of completeness, the algorithm used in the preferred embodiment will be presented below.

Once the physical network has been determined, the user may select a "physical view" in which the proposed physical circuits for linking the sites are shown. In this particular example, the physical view is identical to the logical view, with the physical circuits being represented by the redrawn lines 300.

Figure 7:
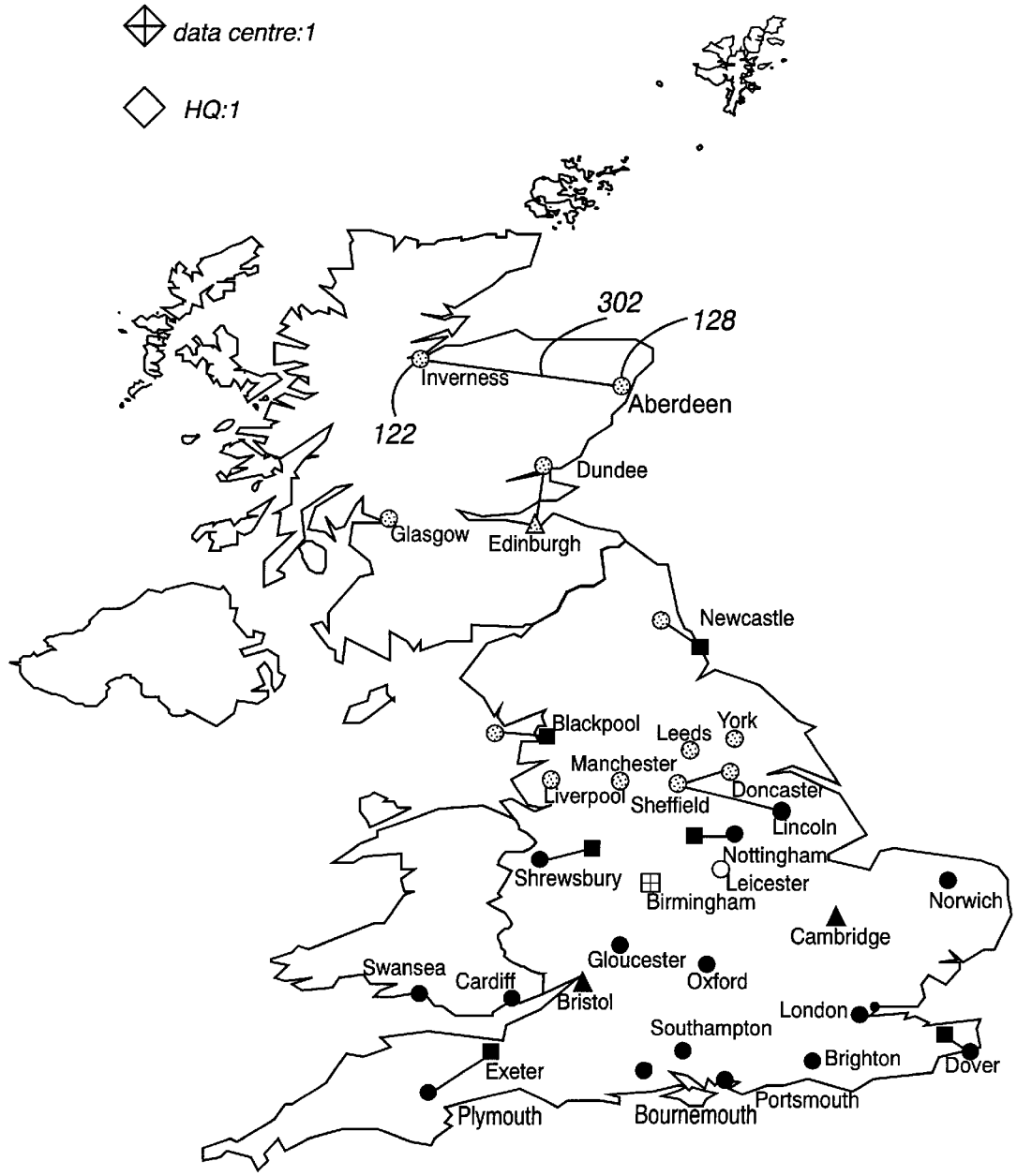
FIG. 7 shows the physical sites and the Points of Presence which will be used by those physical sites.

A further view available to the user is the PoP view, illustrated in FIG. 7. This shows the physical sites 122 along with the corresponding Points of Presence 128 that those sites will be using. Where a physical site is separated from its corresponding Point of Presence, the site and the PoP are connected by lines 302. In this view it may be seen, for instance, that the Inverness site will be using a Point of Presence at Aberdeen. Since this is likely to be expensive, the user may wish at this stage to consider a redesign which avoids such a lengthy call to the PoP.

Each PoP 128 is an object within the PoP class 28 shown in FIG. 2. The system may automatically obtain details of the PoP location, and other attributes, from a PoP database 205 (FIG. 1).

A more complex scenario will now be described, with reference to FIGS. 5 and 6, which cover the situation in which some of the physical sites are to be connected by one service, and some are to be connected by another. Typically, the requirement may be that a customer's major sites are to be connected by a backbone or core network, having high data transmission capability, with the outlying or branch sites being coupled into the core network via a lower-specification access network.

Figure 5:
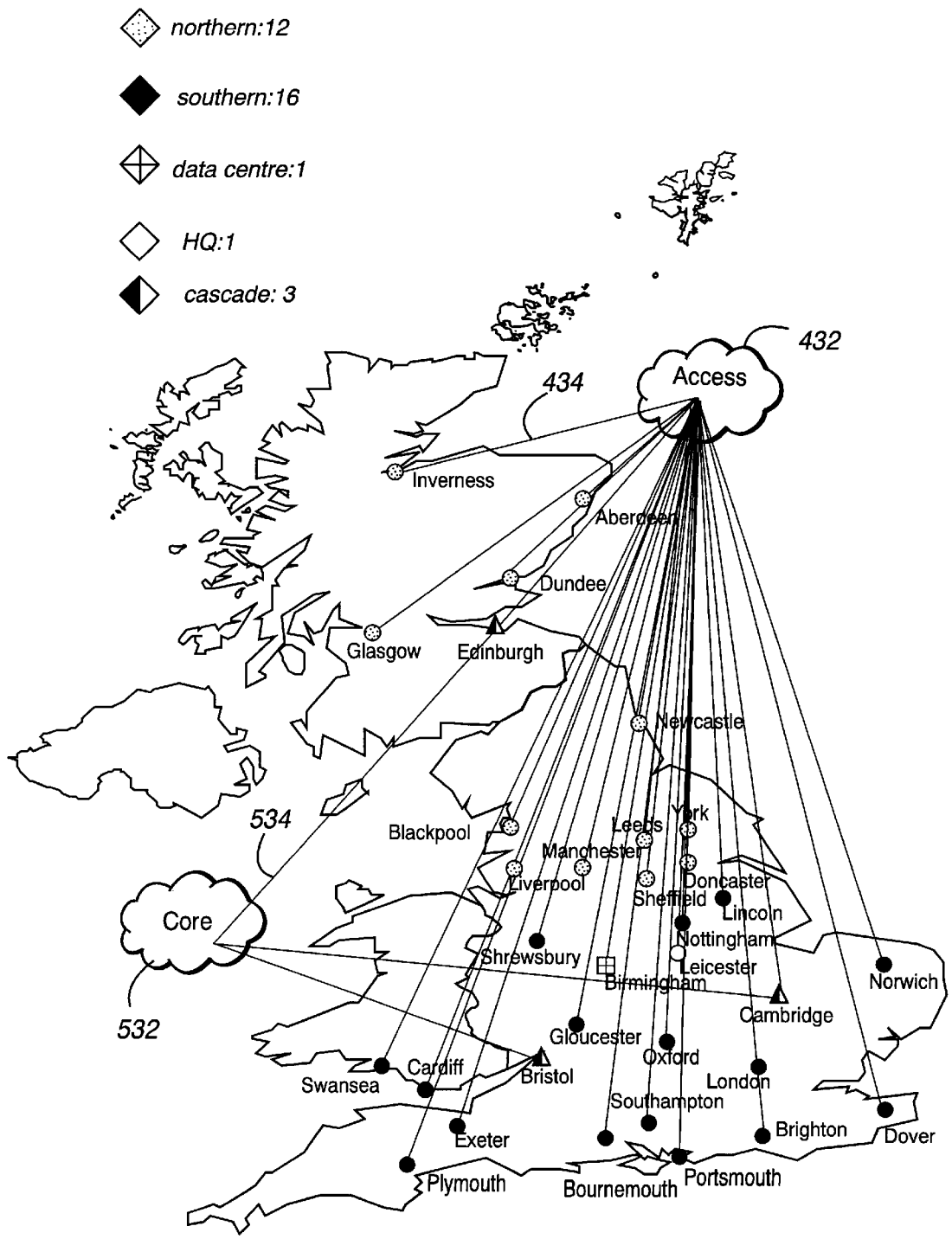
FIG. 5 shows another "service" view, where the sites are to be connected via two different services.

This is illustrated in the service view of FIG. 5, showing some of the sites connected by links 534 to a core cloud 532, and others connected by links 434 to an access cloud 432. The linkages are conveniently made by classifying each of the sites as either Host, Cascade or Client. A Host site is a physical site that typically will have a main server or a mainframe. A Client is a branch or network endpoint, that typically may need lookup or low volume access to the main computers. A Cascade site is a site on the core network through which branch sites can connect. The Cascade sites are sometimes said to form part of a "concentration layer", between the access and core networks.

Figure 6:
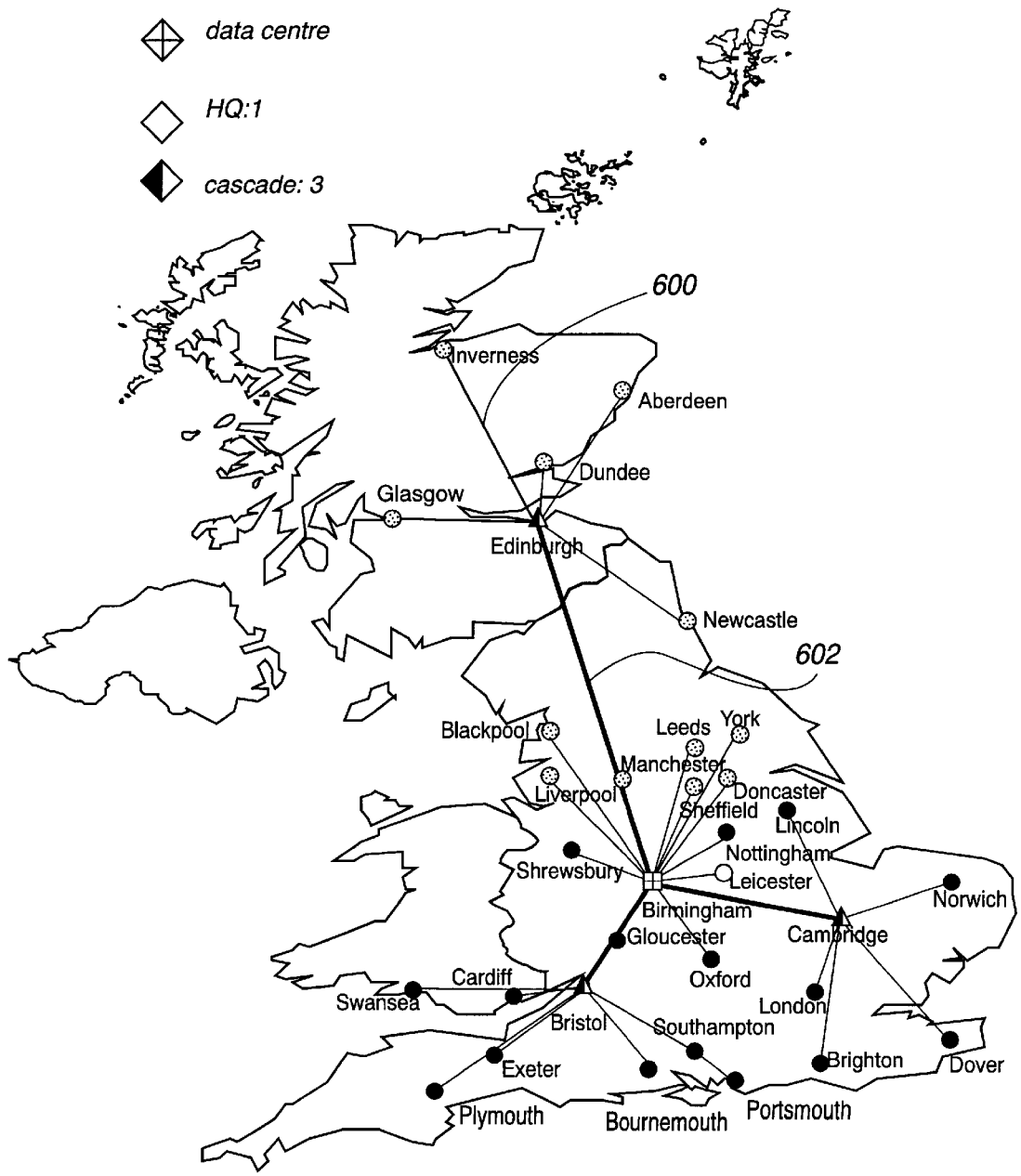
FIG. 6 shows a "physical" view, illustrating actual circuits between physical sites.

Once the type of core and access networks have been specified in FIG. 5, the system uses its standard algorithm to construct the physical network, shown in FIG. 6. This shows the recommended actual physical connections between the sites, some lines such as 600 representing an access connection and some such as 602 representing circuits within the core network.

The algorithm for determining the physical circuits from the information provided by the user is, as mentioned above, a relatively conventional minimisation problem. For the sake of completeness, however, the preferred algorithm will now be set out. This algorithm makes use of a score function Score (t), to be determined for each traffic demand object t. This is a function of the attributes of t, including the bandwidth, the priority, the distance between the corresponding endpoints, and whether or not the endpoints are connected by the core service. The algorithm is as follows:

1. For each traffic demand object t, calculate
   Score (t)=f (Bandwidth, Priority, Distance, Core)
2. Sort Score (t) into a List L, highest first
3. For each traffic demand, t, in L:
   (a) If t is to run over a Cloud Technology, set MaxDepth= 1; otherwise, set MaxDepth=Priority+1
   (b) Can we find a suitable path, from the circuits already set up, which satisfies the requirements of t and where Depth≦ MaxDepth?
   (i) If yes:
      traverse path and uprate the bandwidth on the constituent circuits; then return to 3 to process next t in L
   (ii) If no:
      Can we make use of a Cascade site that will provide a path that satisfies the constraints of t, and where Depth≦MaxDepth
      (1) If yes: traverse path and uprate the bandwidth on the constituent circuits; then return to 3 to process next t in L
      (2) If no: Create new circuit(s); then return to 3 to process next t in L
4. Output results.

At this stage, a check is made as to whether any circuit would be overloaded. If so, the system automatically adds additional circuits to allow load-sharing. A modified algorithm may if desired be used in which some physical circuits are specified in advance by the user. These circuits are then "forced", and cannot be altered by the system.

The preferred model incorporates the concepts of "utilization" and "oversubscription". Utilization allows the user to specify that the maximum utilization for a cloud should be say, X%. The system then ensures that the design is such that the utilization for that cloud will always be lower than that amount. Oversubscription allows the user to specify that some services may be oversubscribed; for example if a hub has five circuits connected to it, each capable of carrying 64 k, the maximum possible hub throughput will be 320 k. However, in a practical network it is unlikely that all five circuits will be operating at maximum capacity at the same time, so the system allows the user to specify that the hub can be "oversubscribed"—eg the hub may be specified at 70% oversubscription, or 224 k. In the service view (FIG. 4), oversubscription may be defined on a per-link basis. For some services, eg Time Division Multiplexing Services, oversubscription may not be appropriate, and for the services the user is not given the option to oversubscribe.

Preferably, the algorithm set out above is first used to calculate the required bandwidths. Then, utilization and oversubscription are applied, and the actual ("declared") bandwidths chosen on the basis of the hardware/services that are actually available to use.

Once the WAN has been fully designed, as shown in FIG. 3 (physical view) or FIG. 6, the information may be passed on to a configurator module 12 (FIG. 1), the primary purpose of which is to configure the local area networks that may be required at each physical site. A database 208 may specify how the WAN circuits are to be coupled to the gateway or gateways into each of the individual LANs.

Once each of the individual LANs has been configured, the consolidated information is passed onto a pricing module 14 (again. FIG. 1). This uses a conventional pricing engine and external pricing database 210 to produce a fully costed estimate for the entire network. The pricing and network information is then passed on to the reports module, which produces a consolidated report as discussed above.

Many of the object attributes referred in FIG. 2 can be used directly by the pricing module: for example, the pricing will of course depend upon the networking service or services to be used. Some services may use a different pricing basis from others; some services may be priced according to the sum of all the required bandwidths, while others may be priced according to the sum of all the actual bandwidths.

It should be understood that it is not essential to the operation of the invention in its broadest form, for any or all of the configurator module, the pricing module or the reports module to be present. Also, if provided, not all of these modules need necessarily be used: for example, the WAN design provided by the designer module 10 may be passed directly to the pricing module 14 to produce an estimate of the WAN design alone, without incorporating the costs of LANs at the individual sites.

What is claimed is:

1. A method of designing a computer network, the method comprising:
   (a) selecting a plurality of site objects, each site object being an object-based computer representation of a corresponding physical site and at least one of said physical sites is a new site not previously physically included in the computer network.
   (b) defining network traffic demands between said new site and at least some of the other physical sites;
   (c) selecting a service object, said service object being an object-based computer representation of a network service for transmitting data between physical sites including the new site, and associating said service object with at least some of the selected site objects; and
   (d) without simulating operation of the network, calculating a network topology including the new site as a site in the network and based on the network traffic demands and the properties of the service object, and producing a physical connectivity map representative of hardware circuits linking physical sites, including the new site, from the calculated network topology.

2. A method as claimed in claim 1 in which the network traffic demands are object-based computer representations of the required traffic flows between physical sites.

3. A method as in claim 1 including the step of displaying the site objects and the service object in a service view, with links connecting each site object with its associated service object.

4. A method as claimed in claim 3 in which the links themselves consist of an object-based computer representation.

5. A method as claimed in claim 1 including selecting from the plurality of site objects a first group of objects, and associating the said group with the service object.

6. A method as claimed in claim 5 in which the group of objects itself consists of an object-based computer representation.

7. A method as claimed in claim 5 in which the service object and the group are represented by display icons, the group being associated with the service object by manipulating on screen the corresponding display icons.

8. A method as claimed in claim 5, including selecting from the plurality of site objects a second group of objects and associating the said second group with a second service object.

9. A method as claimed in claim 1 including the step of displaying the physical connectivity map, showing site objects linked by proposed physical circuits.

10. A method as claimed in claim 9 in which the proposed physical circuits themselves consist of an object-based computer representation.

11. A method as claimed in claim 1 including determining for each physical site a Point of Presence at which the said site connects into the network.

12. A method as claimed in claim 11 in which each Point of Presence consists of an object-based computer representation.

13. A method as claimed in claim 1 in which the physical connectivity map is passed to a configurator module for designing a Local Area Network at each physical site.

14. A method as claimed in claim 1 in which the physical connectivity map is passed to a pricing module which calculates an overall network price.

15. A method as claimed in claim 14 in which the network price is at least partly based on attributes of objects making up the map.

16. A method as claimed in claim 1 in which the service object and the site objects are represented by display icons, the service object being associated with the site objects by manipulating on screen the corresponding display icons.

* * * * *